UNITED STATES PATENT OFFICE

2,476,939

SELF-HARDENING COMPOSITION OF MELAMINE-FORMALDEHYDE RESIN AND A HYDRATED ALKALINE EARTH OXIDE

John K. Wise, Evanston, Ill., assignor to United States Gypsum Company, Chicago, Ill., a corporation of Illinois No Drawing. Application May 4, 1945, Serial No. 592,065

4 Claims. (Cl. 260—67.6)

The present invention relates to a composition of matter consisting of a melamine formaldehyde resin and a hydrated alkaline earth oxide such as that of calcium, barium, strontium or magnesium to effect its insolubilization or curing in the cold, i. e. at room temperature.

Water-soluble condensation products of melamine and formaldehyde have been known for some time and particularly are described in a certain patent to Talbot No. 2,260,239.

These condensation porducts of melamine and formaldehyde are characterized as being soluble in water, but are capable of being rendered insoluble in water, or cured, by the addition thereto of either an acid or some substance which either by hydrolysis or as a result of the evaporation of the solution will render the solution somewhat acid. Under these conditions the melamine formaldehyde condensation product will form a water-insoluble resinous product.

The curing of the melamine condensation product by acid-reacting substances can be further accelerated by heating.

It has not been known, however, that water-soluble melamine-formaldehyde resins are capable of being rendered insoluble at room temperatures by means of an alkaline earth hydroxide. Applicant has discovered the surprising fact that if an alkaline earth hydroxide is mixed with an aqueous solution of a melamine-formaldehyde resin, a reaction takes place as the result of which a water-insoluble complex is formed. Taking advantage of this discovery, applicant has formulated a number of compositions which are suited either as coating compositions or paints or which may be used as adhesives, laminating adhesives, and plastering compositions and the like. These compositions consist essentially of a pulverized melamine-formaldehyde condensation product, an alkaline earth hydroxide, and sufficient water to dissolve the condensation product. For most purposes the alkaline earth hydroxide is either that of calcium or of a mixture of calcium and magnesium hydroxides such for example as pressure-hydrated dolomitic lime.

Various composition were made up, using, in each case 20 grams of the dry powdered water-soluble melamine-formaldehyde resin, and varying amounts of alkaline earth hydroxides or hydrated oxides. These mixtures were tested for water-resistance as indicated further hereinbelow.

The examples are tabulated in subjoined table.

Table

|  | Resin, Parts | Accelerator, Parts | Water, Parts | Washability, strokes |
|---|---|---|---|---|
| Powdered Melamine Formaldehyde Resin | 20 |  |  |  |
| #1 High Calcium hydrate | 20 | 20 | 20 | 80 |
| #2 High Calcium hydrate | 20 | 10 | 10 | 90 |
| #3 High Calcium hydrate | 20 | 5 | 13 | 62 |
| #4 Pressure-hydrated Dolomitic Lime | 20 | 20 | 18 | 88 |
| #5 Pressure-hydrated Dolomitic Lime | 20 | 10 | 12 | 71 |
| #6 Ba(OH)$_2$. 8H$_2$O | 20 | 10 | 9 | 100 |
| #7 Sr (OH)$_2$ | 20 | 10 | 9 | 150 |
| #8 Mg(OH)$_2$ | 20 | 10 | 12 | 59 |
| #9 Portland Cement | 20 | 10 | 6 | 116 |
| #10 High Alumina Portland Cement | 20 | 10 | 6 | 70 |
| #11 Resin alone | 20 | none | 11 | 40 |

In testing the above products, films thereof were formed on heavy cardboard and then allowed to dry over night at room temperature, whereafter they were subjected to abrasion, while being kept wet, with #1 steel wool, which was applied with an even pressure so that the results would be comparable. The number of strokes required to remove the formed film from about one third to one half of the test area is recorded under the heading of "washability" in the examples.

Obviously therefore the larger the number under the heading "washability" the greater the degree of insolubilization.

It will be noticed that Example 11 does not contain the alkaline earth hydroxide and is given merely for purposes of comparison. In other words, the product containing the hydrated alkaline earth oxides had much greater water resistance than the coating consisting merely of the melamine-formaldehyde resin alone (Example 11). The markedly improved results with the use of Portland cement, pressure-hydrated dolomitic lime and strontium hydroxide should be noted.

It was not known prior to applicant's discovery that these alkaline earth hydroxides would be capable of insolubilizing the melamine-formaldehyde condensation products or at least forming therewith a water resistant compound at room temperatures.

The invention may be employed for the formulation of suitable paints as by the incorporation with the material of suitable pigments, dyes or colors. These colors, of course, must be of a kind which is resistant to the effects of alkaline earth hydrates such as lime. Inasmuch as lime-proof colors are well known and freely obtainable commercially, a listing thereof is not deemed essential for the proper understanding of the present invention.

Sufficient tests have been made with the various alkaline earth hydroxides to demonstrate the fact that they will insolubilize the melamine formaldehyde condensation products at room temperatures but by reason of cost and availability, lime, and particularly pressure-hydrated dolomitic lime, constitutes the preferred embodiment of the present invention.

The invention may also be employed for the formulation of suitable laminating adhesives such as are suitable, for example, in the manufacture of plywood and the like, in which case fillers may be incorporated, if desired, provided that they do not adversely affect either the melamine formaldehyde condensation products or the alkaline earth hydroxides, or interfere with the reaction between these ingredients.

The terms "lime" and "hydrated lime" are intended, as is common in the trade, to cover the various commercial products, thus including the dolomitic and other magnesium-containing limes, such as the pressure-hydrated products in which both the magnesium oxide as well as the calcium oxide have been hydrated. Also, the use of the corresponding oxides of the alkaline earths (by which latter term magnesium oxide is intended to be included), which become hydrated upon admixture with water, is to be considered as within the scope of the invention.

Accordingly, applicant claims:

1. A powdered composition suitable for conversion into a self-hardening coating or adhesive composition by the addition of water, whose principal active ingredient consists of a water-soluble melamine-formaldehyde condensation product and, as the sole insolubilizing agent for said condensation product, of from about one-fourth to about one part of the latter of an hydrated alkaline earth oxide reactive therewith to insolubilize said condensation product from its aqueous solution at normal room temperature.

2. The composition as defined in claim 1 in which the hydrated alkaline earth oxide is that of calcium.

3. The composition as defined in claim 1 in which the hydrated alkaline earth oxide is that of strontium.

4. The composition as defined in claim 1, in which the hydrated alkaline earth oxide is that of barium.

JOHN K. WISE.

REFERENCES CITED

The following references are of record in the file of this patent:

UNITED STATES PATENTS

| Number | Name | Date |
|---|---|---|
| 2,200,164 | Durant | May 7, 1940 |
| 2,348,244 | Dearing | May 9, 1944 |